US011725597B2

(12) United States Patent
Manoukian (10) Patent No.: US 11,725,597 B2
(45) Date of Patent: Aug. 15, 2023

(54) SYSTEM AND METHOD FOR EXITING AN ASYMMETRIC ENGINE OPERATING REGIME (71) Applicant: PRATT & WHITNEY CANADA CORP., Longueuil (CA)

(72) Inventor: Patrick Manoukian, Saint-Laurent (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 820 days.

(21) Appl. No.: 16/656,764

(22) Filed: Oct. 18, 2019

(65) Prior Publication Data

US 2020/0256265 A1 Aug. 13, 2020

Related U.S. Application Data (60) Provisional application No. 62/803,070, filed on Feb. 8, 2019, provisional application No. 62/803,064, filed on Feb. 8, 2019.

(51) Int. Cl.
*F02D 29/02* (2006.01)
*F02C 6/02* (2006.01)
(52) U.S. Cl.
CPC ............... *F02D 29/02* (2013.01); *F02C 6/02* (2013.01); *F05D 2220/323* (2013.01); *F05D 2270/04* (2013.01); *F05D 2270/13* (2013.01)
(58) Field of Classification Search
CPC .... F02C 6/02; F02C 6/20; F02C 6/206; F02C 9/42; F02C 9/44; F02C 9/46; F02C 9/54; F02C 9/56; F02C 7/26; F02C 7/262; F02C 7/268; F05D 2270/07; F05D 2270/09; F05D 2270/13; B64D 31/10; B64D 31/12
See application file for complete search history.

(56) References Cited

U.S. PATENT DOCUMENTS

| 3,869,862 A | 3/1975 | Dickey et al. |
| 4,147,024 A | 4/1979 | Moellmann |
| 4,280,060 A | 7/1981 | Kure-Jensen et al. |
| 4,488,236 A | 12/1984 | Morrison et al. |
| 4,500,966 A | 2/1985 | Zagranski et al. |
| 4,641,268 A | 2/1987 | Zweifel et al. |

(Continued)

FOREIGN PATENT DOCUMENTS

| FR | 2946018 B1 | 9/2012 |
| RU | 2393977 C1 | 7/2010 |
| WO | 2015145036 A1 | 10/2015 |

*Primary Examiner* — Todd E Manahan
*Assistant Examiner* — David P. Olynick
(74) *Attorney, Agent, or Firm* — Norton Rose Fulbright Canada LLP (57) ABSTRACT Methods and systems for operating an aircraft having two or more engines are described. The method comprises operating the two or more engines of the aircraft in an asymmetric operating regime, wherein a first of the engines is in an active mode to provide motive power to the aircraft and a second of the engines is in a standby mode to provide substantially no motive power to the aircraft, receiving a request to exit the asymmetric operating regime, the request having at least one parameter associated therewith, selecting one of a plurality of available exit protocols as a function of the at least one parameter, and applying the exit protocol by commanding the engines accordingly.

8 Claims, 5 Drawing Sheets

(56) References Cited

U.S. PATENT DOCUMENTS

| | | | |
|---|---|---|---|
| 5,088,043 | A | 2/1992 | Akishino et al. |
| 5,128,869 | A | 7/1992 | Akishino et al. |
| 5,285,638 | A | 2/1994 | Russ et al. |
| 5,313,778 | A | 5/1994 | Sweet et al. |
| 5,363,317 | A | 11/1994 | Rice et al. |
| 5,782,427 | A | 7/1998 | Hermach |
| 6,041,273 | A | 3/2000 | Burken et al. |
| 6,378,492 | B1 | 4/2002 | Liu et al. |
| 6,659,079 | B2 | 12/2003 | Price et al. |
| 6,694,741 | B2 | 2/2004 | Franklin et al. |
| 6,748,744 | B2 | 6/2004 | Peplow et al. |
| 6,902,512 | B2 | 6/2005 | Kamichi et al. |
| 7,031,812 | B1 | 4/2006 | Pettigrew et al. |
| 7,100,868 | B2 | 9/2006 | Volker |
| 7,407,133 | B2 | 8/2008 | Bacon |
| 7,756,612 | B2 | 7/2010 | Salesse-Lavergne |
| 7,949,440 | B2 | 5/2011 | Ramos et al. |
| 8,185,291 | B2 | 5/2012 | Nakakita et al. |
| 8,290,683 | B2 | 10/2012 | Luppold |
| 9,008,942 | B2 | 4/2015 | Dyrla et al. |
| 9,038,939 | B2 | 5/2015 | Dyrla et al. |
| 9,045,223 | B2 | 6/2015 | Connaulte et al. |
| 9,074,537 | B2 | 7/2015 | Wang et al. |
| 9,355,571 | B2 | 5/2016 | Rucci et al. |
| 9,415,877 | B2 | 8/2016 | Nobelen et al. |
| 9,429,077 | B2 * | 8/2016 | Morgan ............... F01D 15/10 |
| 9,476,360 | B2 | 10/2016 | Corpron |
| 9,500,138 | B1 | 11/2016 | Cai et al. |
| 9,542,855 | B2 | 1/2017 | Dumur et al. |
| 9,676,488 | B2 | 6/2017 | Alber et al. |
| 9,753,894 | B2 | 9/2017 | Heinzerling et al. |
| 9,828,917 | B2 | 11/2017 | Klonowski et al. |
| 9,849,997 | B2 | 12/2017 | Nobelen |
| 9,889,944 | B2 | 2/2018 | Schmidt |
| 9,914,536 | B2 | 3/2018 | Rossotto |
| 10,112,723 | B2 * | 10/2018 | Rossotto ............... B64D 31/06 |
| 10,232,950 | B2 | 3/2019 | McCullough et al. |
| 10,343,757 | B2 | 7/2019 | Bailey et al. |
| 10,738,698 | B2 * | 8/2020 | Simonetti ............... F02C 7/26 |
| 10,961,915 | B2 * | 3/2021 | Simonetti ............... F01D 13/00 |
| 2004/0088085 | A1 | 5/2004 | Nobre |
| 2008/0081734 | A1 | 4/2008 | Duffy et al. |
| 2012/0116613 | A1 * | 5/2012 | Daumas ............... F02C 9/46 |
| | | | 701/3 |
| 2013/0139518 | A1 * | 6/2013 | Morgan ............... F02C 3/10 |
| | | | 60/773 |
| 2013/0219905 | A1 * | 8/2013 | Marconi ............... F02C 7/268 |
| | | | 60/39.12 |
| 2016/0069268 | A1 | 3/2016 | Chapman |
| 2016/0311548 | A1 * | 10/2016 | Thiriet ............... F01D 21/02 |
| 2017/0101938 | A1 | 4/2017 | Lescher et al. |
| 2017/0323573 | A1 | 11/2017 | Decker et al. |
| 2018/0022464 | A1 | 1/2018 | Gelwan et al. |
| 2018/0080378 | A1 | 3/2018 | Alecu |
| 2018/0080380 | A1 * | 3/2018 | Simonetti ............... B64D 35/08 |
| 2018/0163640 | A1 | 6/2018 | Dubreuil et al. |
| 2018/0201386 | A1 * | 7/2018 | Strauss ............... B64C 27/12 |
| 2018/0370646 | A1 | 12/2018 | Hon et al. |
| 2019/0002115 | A1 | 1/2019 | Miller et al. |
| 2021/0246827 | A1 * | 8/2021 | Lafarque ............... F02C 7/08 |

* cited by examiner

SYSTEM AND METHOD FOR EXITING AN ASYMMETRIC ENGINE OPERATING REGIME

CROSS-REFERENCE TO RELATED APPLICATIONS

The present application claims the benefit of Provisional Patent Application No. 62/803,064 filed on Feb. 8, 2019, and Provisional Patent Application No. 62/803,070 filed on Feb. 8, 2019, the contents of which are hereby incorporated in their entirety.

TECHNICAL FIELD

The present disclosure relates generally to engine operation in a multi-engine aircraft, and more particularly to exiting a mode of operation where the engines are operating asymmetrically.

BACKGROUND OF THE ART

When operating aircraft with multiple engines, there may be certain portions of a mission that do not require both engines to be operating at full regime. In cruising conditions, operating a single engine at a relatively high regime, instead of both engines at lower regimes, may allow for better fuel efficiency.

Improvements are needed for managing the various engine operating regimes.

SUMMARY

In accordance with a broad aspect, there is provided a method for operating an aircraft having two or more engines are described. The method comprises operating the two or more engines of the aircraft in an asymmetric operating regime, wherein a first of the engines is in an active mode to provide motive power to the aircraft and a second of the engines is in a standby mode to provide substantially no motive power to the aircraft, receiving a request to exit the asymmetric operating regime, the request having at least one parameter associated therewith, selecting one of a plurality of available exit protocols as a function of the at least one parameter, and applying the exit protocol by commanding the engines accordingly.

In accordance with another broad aspect, there is provided a system for operating an aircraft having two or more engines. The system comprises a processing unit and a non-transitory storage medium having stored thereon program code. The program code is executable by the processing unit for operating the two or more engines of the aircraft in an asymmetric operating regime, wherein a first of the engines is in an active mode to provide motive power to the aircraft and a second of the engines is in a standby mode to provide substantially no motive power to the aircraft, receiving a request to exit the asymmetric operating regime, the request having at least one parameter associated therewith, selecting one of a plurality of available exit protocols as a function of the at least one parameter, and applying the exit protocol by commanding the engines accordingly.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1A:
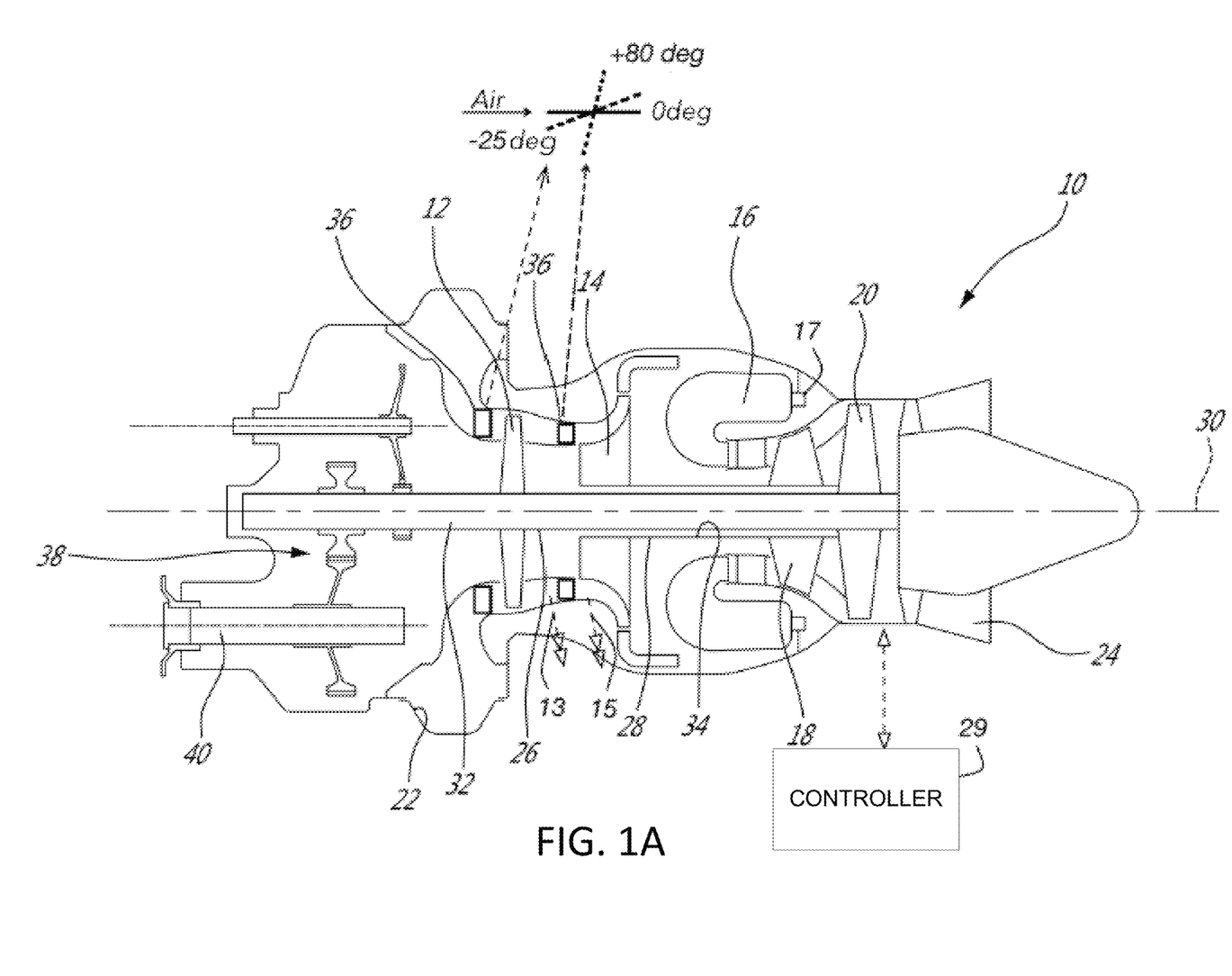
FIG. 1A is a schematic cross-sectional view of a gas turbine engine.

FIG. 1A illustrates a gas turbine engine 10. In this example, the gas turbine 10 is a turboshaft engine generally comprising in serial flow communication a low pressure (LP) compressor section 12 and a high pressure (HP) compressor section 14 for pressurizing air, a combustor 16 in which the compressed air is mixed with a fuel flow, delivered to the combustor 16 via fuel nozzles 17 from fuel system (not depicted), and ignited for generating a stream of hot combustion gases, a high pressure turbine section 18 for extracting energy from the combustion gases and driving the high pressure compressor section 14 via a high pressure shaft 34, and a low pressure turbine section 20 for further extracting energy from the combustion gases and driving the low pressure compressor section 12 via a low pressure shaft 32.

The turboshaft engine 10 may include a transmission 38 driven by the low pressure shaft 32 and driving a rotatable output shaft 40. The transmission 38 may optionally be provided to vary a ratio between rotational speeds of the low pressure shaft 32 and the output shaft 40. The compressors and turbines are arranged is low and high pressures spools 26, 28, respectively. In use, one or more controllers 29, such as one or more full authority digital controllers (FADEC) providing full authority digital control of the various relevant parts of the engine 10, control operation of the engine 10. The controller 29 may also be an engine control unit (ECU) or electronic engine control (EEC), forming part of the FADEC. Each controller 29 may be used to control one or more engines 10 of an aircraft (H). Additionally, in some embodiments the controller(s) 29 may be configured for controlling operation of other elements of the aircraft (H), for instance the main rotor 44.

The low pressure compressor section 12 is configured to independently rotate from the high pressure compressor section 14 by virtues of their mounting on different engine spools. The low pressure compressor section 12 may include one or more compression stages, and the high pressure compressor section 14 may include one or more compression stages. In the embodiment shown in FIG. 1, the low pressure (LP) compressor section 12 includes a single compressor stage 12A, which includes a single mixed flow rotor (MFR), for example such as described in U.S. Pat. No. 6,488,469 B1, entitled "MIXED FLOW AND CENTRIFUGAL COMPRESSOR FOR GAS TURBINE ENGINE", the contents of which are hereby expressly incorporated herein by reference in its entirety.

The LP compressor 12 and the HP compressor 14 are configured to deliver desired respective pressure ratios in use, as will be described further below. The LP compressor 12 may have a bleed valve 13 (shown schematically) which may be configured to selectively bleed air from the LP compressor 12 according to a desired control regime of the engine 10, for example to assist in control of compressor stability. The design of such valve 13 is well known and not described herein in further detail. Any suitable bleed valve arrangement may be used.

As mentioned, the HP compressor section 14 is configured to independently rotate from the LP compressor section 12 by virtue of their mounting on different engine spools. The HP compressor section 14 may include one or more compression stages, such as a single stage, or two or more stages 14A as shown in more detail in FIG. 1B. It is contemplated that the HP compressor section 14 may include any suitable type and/or configuration of stages. The HP compressor is configured to deliver a desired pressure ratio in use, as will be described further below. The HP compressor 14 may have a bleed valve 15 (shown schematically) which may be configured to selectively bleed air from the HP compressor section 14 according to a desired control regime of the engine 10, for example to assist in control of compressor stability. The design of such valve 15 is well known and not described herein in further detail. Any suitable bleed valve arrangement may be used.

The engine 10 has two or more compression stages 12, 14 to pressurize the air received through an air inlet 22, and corresponding turbine stages 18, 20 which extract energy from the combustion gases before they exit via an exhaust outlet 24. In the illustrated embodiment, the turboshaft engine 10 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors, and need not mean the simple shaft arrangements depicted.

The low pressure spool 26 may include a low pressure shaft 32 interconnecting the low pressure turbine section 20 with the low pressure compressor section 12 to drive rotors of the low pressure compressor section 12. The low pressure compressor section 12 may include at least one low pressure compressor rotor directly drivingly engaged to the low pressure shaft 32, and the low pressure turbine section 20 may include at least one low pressure turbine rotor directly drivingly engaged to the low pressure shaft 32 so as to rotate the low pressure compressor section 12 at a same speed as the low pressure turbine section 20. In other embodiments (not depicted), the low pressure compressor section 12 may be connected via a suitable transmission (not depicted) to run faster or slower (as desired) than the low pressure turbine section 20.

The high pressure spool 28 includes a high pressure shaft 34 interconnecting the high pressure turbine section 18 with the high pressure compressor section 14 to drive rotor(s) of the high pressure compressor section 14. The high pressure compressor section 14 may include at least one high pressure compressor rotor (in this example, two rotors are provided, a MFR compressor 14A and a centrifugal compressor 14B) directly drivingly engaged to the high pressure shaft 34. The high pressure turbine section 18 may include at least one high pressure turbine rotor (in this example there is one HP turbine 18A) directly drivingly engaged to the high pressure shaft 34 so as to drive the high pressure compressor section 14 at a same speed as the high pressure turbine section 18. In some embodiments, the high pressure shaft 34 and the low pressure shaft 32 are concentric, though any suitable shaft and spool arrangement may be employed.

The turboshaft engine 10 may include a set of variable guide vanes (VGVs) 36 upstream of the LP compressor section 12, and may include a set of variable guide vanes (VGVs) 36 upstream of the HP compressor section 14. The first set of variable guide vanes 36A may be provided upstream of the low pressure compressor section 12. A set of variable guide vanes 36B may be provided upstream of the high pressure compressor section 14. The variable guide vanes 36A, 36B may be independently controlled by suitable one or more controllers 29, as described above. The variable guide vanes 36A, 36B may direct inlet air to the corresponding stage of compressor sections 12, 14. The set of variable guide vanes 36A, 36B may be operated to modulate the inlet airflow to the compressors in a manner which allows for improved control of the output power of the turboshaft engines 10, as described in more detail below. The VGVs may be provided with any suitable operating range. In some embodiments, VGV vanes 36B may be configured to be positioned and/or modulated between about +80 degrees and about −25 degrees, with 0 degrees being defined as aligned with the inlet airflow, as depicted schematically in FIG. 1. In a more specific embodiment, the VGV vanes 36A and/or 36B may rotate in a range from +78.5 degrees to −25 degrees, or from +75 degrees to −20 degrees, and more particularly still from 70 degrees to −20 degrees. The two set of VGV vanes 36 may be configured for a similar range of positions, or other suitable position range.

In some embodiments, the set of variable guide vanes 36A upstream of the low pressure compressor section 12 may be mechanically decoupled from the set of variable guide vanes 36B upstream of the high pressure compressor section 14, having no mechanical link between variable guide vanes 36A, 36B to permit independent operation of the respective stages. The VGV vanes 36A, 36B may be operatively controlled by the controller(s) 29 described above, to be operated independently of each other. Indeed, the engines 10A, 10B are also controlled using controller(s) 29 described above, to carry out the methods described in this document. For the purposes of this document, the term "independently" in respects of the VGVs 36 means that the position of one set of the VGV vanes (e.g. 36A) may be set without effecting any change to a position of the other set of the VGV vanes (e.g. 36B), and vice versa.

Independent control of the VGVs 36A, 36B may allow the spools 26, 28 to be operated to reduce or eliminate or reduce aerodynamic coupling between the spools 26, 28. This may permit the spools 26, 28 to be operated at a wider range of speeds than may otherwise be possible. The independent control of the VGV vanes 36A, 36B may allow the spools 26, 28 to be operated at constant speed over a wider operating range, such as from a "standby" speed to a "cruise" power speed, or a higher speed. In some embodiments, independent control of the VGVs 36A, 36B may allow the spools 26, 28 to run at speeds close to maximum power. In some embodiments, independent control of the VGVs 36A, 36B may also allow one of the spools 26, 28 to run at high speed while the other one run at low speed.

In use, the engine 10 is operated by the controller(s) 29 described above to introduce a fuel flow via nozzles 17 to the combustor 16. Combustion gases turn turbine sections 18, 20 which in turn drive the compressor sections 12, 14. The controller(s) 29 control(s) the angular position of VGVs 36A, 36B in accordance with a desired control regime, as will be described further below. The speed of the engine 10 is controlled, at least in part, by the delivery of a desired fuel flow rate to the engine, with a lower fuel flow rate causing the engine 10 to operate at a lower output speed than a higher fuel flow rate.

Figure 1B:
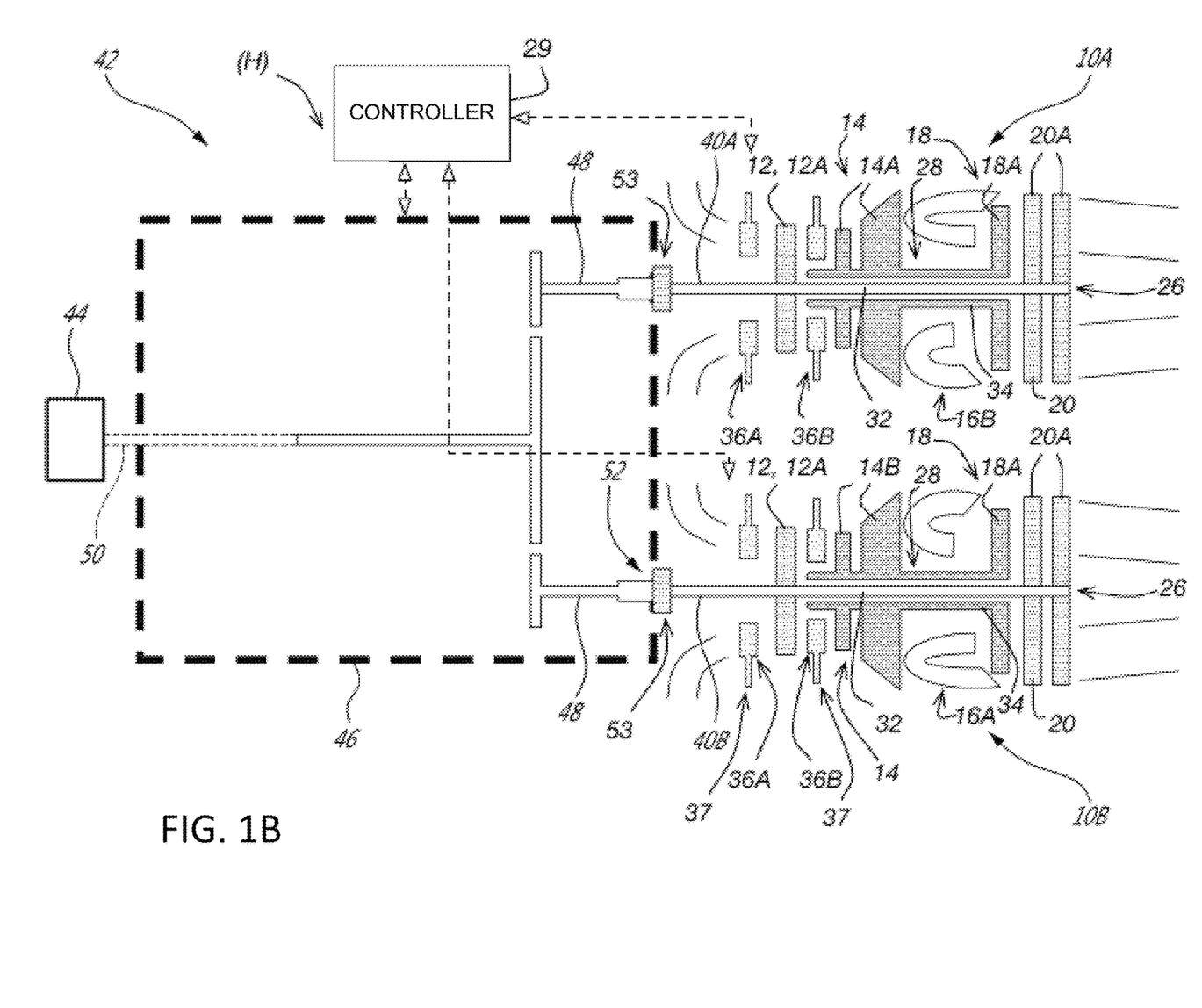
FIG. 1B is a schematic representation of an exemplary multi-engine system, showing two of the FIG. 1 engines.

Such control strategies may allow for a faster "power recovery" of the engine 10 (when an engine is accelerated from a low output speed to a high output speed), possibly because the spools 26, 28 can be affected relatively less by their inherent inertia through the described use of spool 26,28 speed control using VGVs 26, as will be further described below. In some embodiments, using the vanes VGV 36A, 36B as described herein, in combination with the use of MFR-based low pressure compressor section 12 and/or MFR-based high pressure compressor section 14 may provide relatively more air and/or flow control authority and range through the core of the engine 10, and/or quicker power recovery.

Where MFR compressors 12 and/or 14 of the engines 10A, 10B are provided as described herein, the control of the VGVs 36A and/or VGV 36B provides for improved stability of engine operation. This may be so even where the VGV is operated at an extreme end of its range, such as in the "closed down" position (e.g. at a position of +80 degrees in one embodiment described herein). This control of the VGVs facilitates the ability of the engine to operate at a very low power setting, such as may be associated with a "standby" mode as described further below herein, wherein the compressor of an engine operating in standby mode is operating in a very low flow and/or low pressure ratio regime.

Turning now to FIG. 1B, illustrated is an exemplary multi-engine system 42 that may be used as a power plant for an aircraft (H), including but not limited to a rotorcraft such as a helicopter. The multi-engine system 42 may include two or more gas turbine engines 10A, 10B. In the case of a helicopter application, these gas turbine engines 10A, 10B will be turboshaft engines. Control of the multi-engine system 42 is effected by one or more controller(s) 29, which may be FADEC(s), electronic engine controller(s) (EEC(s)), or the like, that are programmed to manage, as described herein below, the operation of the engines 10A, 10B to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 42. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions (cruise speed and altitude) are substantially stable, the engines 10A, 10B of the system 42 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a lower-power (which could be no power, in some cases) "standby mode" while the other engine is operated in a high-power "active" mode. Such an asymmetric operation is engaged for a cruise phase of flight (continuous, steady-state flight which is typically at a given commanded constant aircraft cruising speed and altitude). The multi-engine system 42 may be used in an aircraft, such as a helicopter, but also has applications in suitable marine and/or industrial applications or other ground operations.

Referring still to FIG. 1B, according to the present description the multi-engine system 42 is driving in this example a helicopter (H) which may be operated in this asymmetric regime, in which a first of the turboshaft engines (say, 10A) may be operated at high power in an active mode and the second of the turboshaft engines (10B in this example) may be operated in a lower-power (which could be no power, in some cases) standby mode. In one example, the first turboshaft engine 10A may be controlled by the controller(s) 29 to run at full (or near-full) power conditions in the active mode, to supply substantially all or all of a required power and/or speed demand of the common load 44. The second turboshaft engine 10B may be controlled by the controller(s) 29 to operate at lower-power or no-output-power conditions to supply substantially none or none of a required power and/or speed demand of the common load 44. Optionally, a clutch may be provided to declutch the low-power engine. Controller(s) 29 may control the engine's governing on power according to an appropriate schedule or control regime. The controller(s) 29 may comprise a first controller for controlling the first engine 10A and a second controller for controlling the second engine 10B. The first controller and the second controller may be in communication with each other in order to implement the operations described herein. In some embodiments, a single controller 29 may be used for controlling the first engine 10A and the second engine 10B.

In another example, an asymmetric operating regime of the engines may be achieved through the one or more controller's 29 differential control of fuel flow to the engines, as described in pending application Ser. No. 16/535,256, the entire contents of which are incorporated herein by reference. Low fuel flow may also include zero fuel flow in some examples.

Although various differential control between the engines of the engine system 42 are possible, in one particular embodiment the controller(s) 29 may correspondingly control fuel flow rate to each engine 10A, 10B accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric operating regime, the standby engine may be maintained between 70% and 99.5% less than the fuel flow to the active engine. In some embodiments, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% to 90%, with fuel flow to the standby engine being 80% to 90% less than the active engine.

In another embodiment, the controller 29 may operate one engine (say 10B) of the multiengine system 42 in a standby mode at a power substantially lower than a rated cruise power level of the engine, and in some embodiments at substantially zero output power and in other embodiments at less than 10% output power relative to a reference power (provided at a reference fuel flow). Alternately still, in some embodiments, the controller(s) 29 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 42 of FIG. 1B may be operated in an asymmetric operating regime by control of the relative speed of the engines using controller(s) 29, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

In use, the first engine (say 10A) may operate in the active mode while the other engine (say 10B) may operate in the standby mode, as described above. During this operation in the asymmetric regime, if the helicopter (H) needs a power increase (expected or otherwise), the second engine 10B may be required to provide more power relative to the low power conditions of the standby mode, and possibly return immediately to a high- or full-power condition. This may occur, for example, in an emergency condition of the multi-engine system 42 powering the helicopter, wherein the "active" engine loses power and the power recovery from the lower power to the high power may take some time. Even absent an emergency, it will be desirable to repower the standby engine to exit the asymmetric operating regime.

Figure 2:
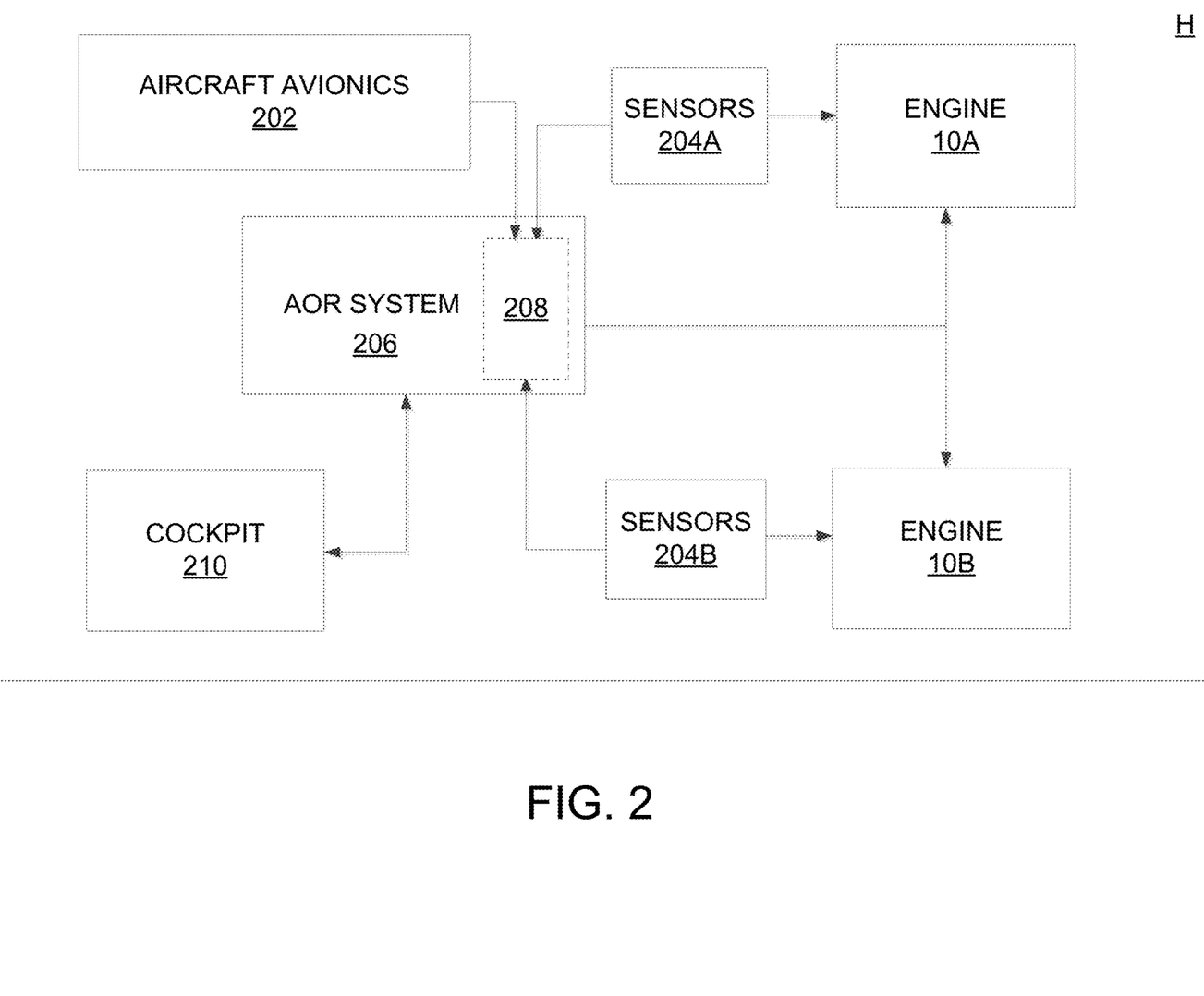
FIG. 2 is a block diagram of an example architecture for exiting an asymmetric operating regime.

Referring to FIG. 2, there is illustrated an aircraft H, comprising two engines 10A, 10B. More than two engines 10A, 10B may be present on a same aircraft H. An AOR system 206 is configured for exiting the asymmetric operating regime.

In some embodiments, the AOR system 206 forms part or all of the controller 29, which may be a FADEC, ECU, EEC, or the like. In some embodiments, the AOR system 206 is a separate computing device that communicates with a FADEC, an ECU, an EEC, and/or any related accessories.

In order to enter the asymmetric operating regime, both engine and aircraft parameters must meet certain operating conditions associated with the asymmetric operating regime. When one or more of these parameters no longer meet the operating conditions, the asymmetric operating regime may be exited. One or more first sensors 204A are operatively coupled to engine 10A, and one or more second sensors 204B are operatively coupled to engine 10B. The sensors 204A, 204B may be any type of sensor used to measure engine parameters, such as but not limited to speed sensors, pressure sensors, temperature sensors, and the like.

In some embodiments, sensor measurements are transmitted to a monitoring device 208 for monitoring the engine parameters and determining whether the engine operating conditions are met or no longer met. Note that not all engine parameters necessarily come from the sensors 204A, 204B. In some embodiments, some of the engine parameters monitored by the monitoring device 208 are received from one or more other source, such as but not limited to a FADEC, an ECU, an EEC, or any related accessories that control any aspect of engine performance. In some embodiments, measurements obtained from the sensors 204A, 204B are used to calculate or determine other related engine parameters.

Aircraft parameters are also monitored to determine whether certain aircraft operating conditions for the asymmetric operating regime are met or no longer met. In some embodiments, the aircraft parameters are obtained by the monitoring device 208 from aircraft avionics 202. The aircraft avionics 202 may include any and all systems related to control and management of the aircraft, such as but not limited to communications, navigation, display, monitoring, flight-control systems, collision-avoidance systems, flight recorders, weather systems, and aircraft management systems. In some embodiments, the aircraft avionics 202 perform all monitoring of the aircraft parameters and communicate with the AOR system 206 and/or the monitoring device 208 when the aircraft operating conditions for the asymmetric operating regime are met or no longer met.

In the embodiment of FIG. 2, the monitoring device 208 is shown to form part of the AOR system 206. Alternatively, the monitoring device 208 is separate therefrom and communicates with the AOR system 206 when the engine operating parameters are met and the aircraft operating parameters are met. Alternatively or in combination therewith, monitoring of some or all of the parameters is performed externally to the AOR system 206 and involves a pilot monitoring some or all of the parameters.

In some embodiments, the AOR system 206 monitors engine and/or aircraft conditions required to enter and exit the asymmetric operating regime. Monitoring may be done continuously or by periodical queries. If at any time the conditions are not respected, the asymmetric operating regime is either exited/aborted or disabled (i.e. cannot be entered).

In some embodiments, the AOR system 206 receives a request to exit the asymmetric operating regime when the engine parameters no longer meet the engine operating conditions for the asymmetric operating regime, for example from the monitoring device 208 or from the cockpit 210. In some embodiments, the AOR system 206 receives a request to exit the asymmetric operating regime when the aircraft parameters no longer meet the aircraft operating conditions for the asymmetric operating regime, for example from the aircraft avionics 202, from the monitoring device 208, or from the cockpit 210. For example, if any one of airspeed, altitude, aircraft generator and/or battery status, or avionic health status for optimal asymmetric operation are not respected, a request to exit the asymmetric operating regime would be received.

A request to exit the asymmetric operating regime based on the engine and/or aircraft parameters no longer being met may be considered as a "normal" category of exit request. A normal exit request should be understood as a request where a return to a mode of operation outside of the asymmetric operating regime is not urgent. For this reason, the AOR system 206 may select and apply an exit protocol that will ensure that passenger comfort and engine life are optimized. An exit protocol corresponding to a slow return to an "all engines operative" (AEO) rating may be selected. For example, any engine operating at low speed during the asymmetric operating regime may be accelerated at a rate of 2% per second to a desired speed. Other acceleration rates may also be used to provide a comfortable recoupling and ensure that sufficient time is allotted for engine thermal expansion.

In some embodiments, the AOR system 206 receives a request to exit the asymmetric operating regime when the active engine fails. For example, the active engine is subject to a loss of power or control. An exit request under these conditions may be considered as an "emergency" category of exit request. An emergency exit request should be understood as a request where a return to a mode of operation outside of the asymmetric operating regime is urgent and should be performed rapidly for safety or security reasons. If the engine experiencing loss of power or control is the active engine, the standby engine needs to be transitioned to a "one engine inoperative" (OEI) rating rapidly in order to avoid rotor droop and subsequent aircraft events. Example exit protocols comprising rapid transitions may be accelerating at 10% per second, 15% per second, or 20% per second. Other rates may also be used.

Requests received by the AOR system 206 based on monitored parameters, including engine power or control, are referred to herein as "system-commanded exits" as they are commanded by a system of the aircraft. The system may be the FADEC, the EEC, the ECU, or an aircraft computer.

In some embodiments, the AOR system 206 receives a request to exit AOR from the cockpit 210. These requests are referred to as pilot-commanded exit requests. Similarly to the system-commanded exit requests, pilot-commanded exit requests may occur in normal circumstances or in emergency circumstances. For example, a pilot may request an exit from the asymmetric operating regime in normal circumstances when the end of a cruise segment of a mission is approaching. Having both (or all) engines available for aircraft control may be required and thus the asymmetric operating regime is to be exited in favor of an AEO rating. Various mission profiles may require interleaved segments of AEO rating and of the asymmetric operating regime.

A pilot-commanded exit request may be received via a cockpit interface and sent to the AOR system 206. This may be done using any interface in the cockpit, for example discrete inputs from a button press or a long hold for added protection against inadvertent selection. In some embodiments, the AOR system 206 may determine, upon receipt of a normal pilot-commanded exit request, whether the standby engine is capable of returning to an AEO rating. For example, the AOR system 206 may review faults and/or conditions which may be impacted or worsened by engine acceleration. Upon confirming that the engine can return to AEO, the engine may be transitioned using a standard exit protocol, i.e. using a low acceleration rate.

An emergency pilot-commanded exit request may be received when a need for dual engine power and control is required urgently, for example for a rapid abort or for object avoidance. Similarly to the normal pilot-commanded exit request, the AOR system 206 may determine whether it would be safe to return to an AEO rating and if so, transition the engines as quickly as possible. In such circumstances, passenger comfort and engine thermal expansion are sacrificed for overall aircraft occupant safety. The acceleration rate for an emergency pilot-commanded exit request may be the same as the acceleration rate for an emergency system-commanded exit request. Alternatively, different rates may apply if one exit category is viewed as more critical than the other.

An emergency pilot-commanded exit request may be received via the cockpit interface, using a different input as the normal pilot-commanded exit request, or using the same input with different parameters (i.e. a longer hold or pressing multiple times on the button). In some embodiments, emergency pilot-commanded exit requests are system-generated in response to a specific pilot-initiated aircraft maneuver. For example, if a pilot reacts to an emergency situation by having the aircraft swerve left at a sharp angle, this may cause the AOR system 206 to generate the pilot-commanded exit request and react accordingly. In some embodiments, emergency pilot-commanded exit requests are system-generated in response to a specific pilot command. For example, if a pilot commands a specific power requirement or a specific rate of change of a power requirement, the AOR system 206 may generate the pilot-commanded exit request and react accordingly.

In response to receiving the request to exit the asymmetric operating regime, the AOR system 206 determines which exit category the request belongs to. For example, the AOR system 206 may distinguish between an emergency request and a normal request. The AOR system 206 may also distinguish between a pilot-commanded request and a system-commanded request. One of a plurality of available exit protocols is then selected as a function of the exit category, and applied to the engines.

Figure 3:
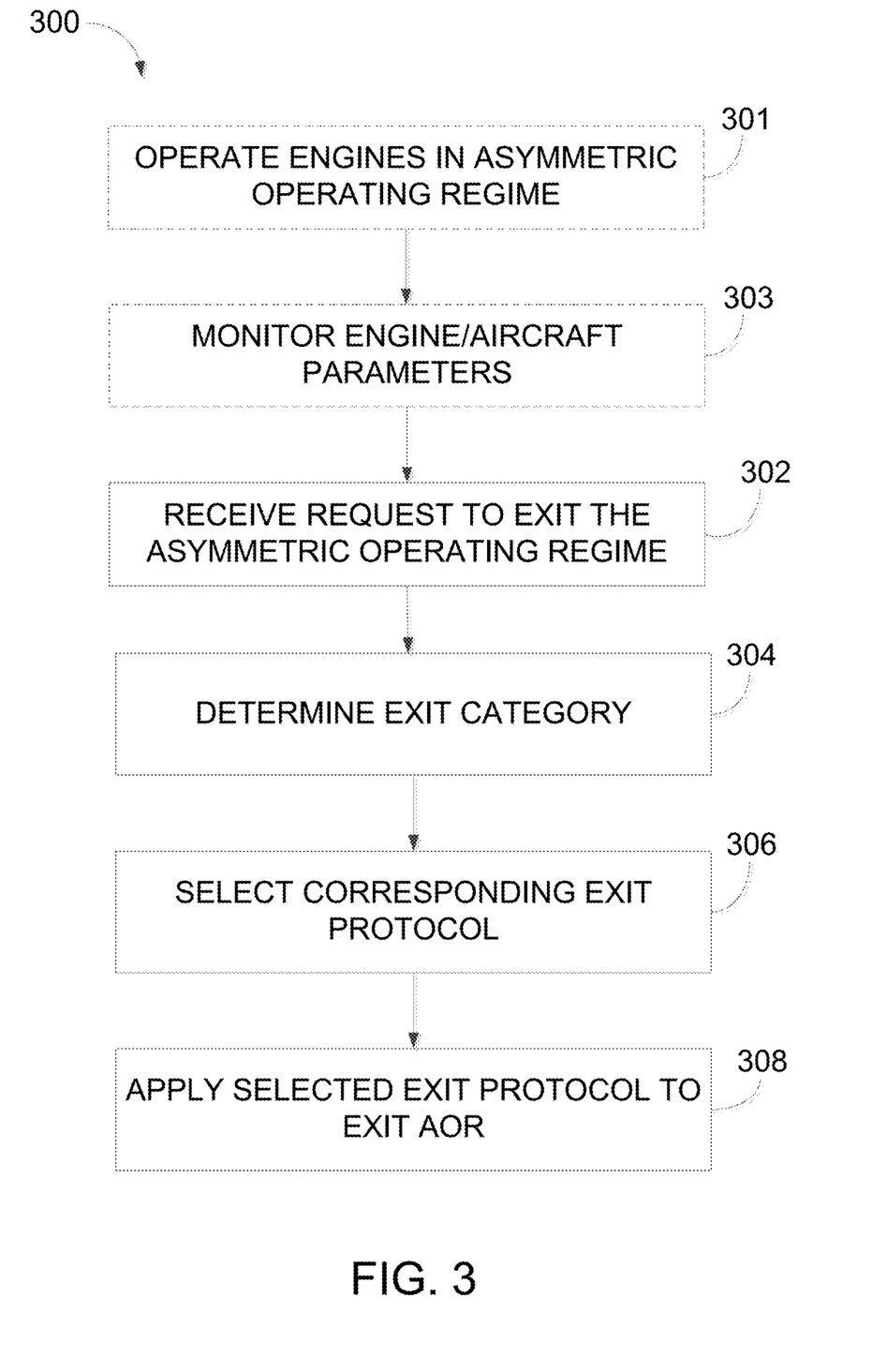
FIG. 3 is a flowchart of an example method for operating a multi-engine aircraft.

Referring now to FIG. 3, there is illustrated a flowchart of an example method 300 for operating a multi-engine aircraft. In some embodiments, the method 300 comprises a step 301 of operating the engines in the asymmetric operating regime. Alternatively, the method 300 begins when the engines are already operating in the asymmetric operating regime and step 301 is omitted. At step 302, a request to exit the asymmetric operating regime is received. In some embodiments, the method 300 comprises a step 303 of monitoring the engine and/or aircraft parameters and determining whether the operating conditions for the engine to remain in the asymmetric operating regime are met. Once the engine and/or aircraft operating conditions are no longer met, a system-commanded request to exit the asymmetric operating regime is generated.

Some example engine operating conditions for entering and/or remaining in the asymmetric operating regime are as follows:

- an absence of engine faults critical to operation of the engine;
- an absence of FADEC faults critical to operation of the engine;
- a difference in torque between two engines is less than a first threshold;
- a difference in inter-turbine temperature between two engines is within a first range;
- an accessory gearbox electrical load is disabled;
- an environmental control system bleed load is disabled;
- active FADEC functions are disabled.

Other engine operating conditions may also be used, alone or in combination with any of the engine operating conditions listed above.

Some example aircraft operating conditions for entering and/or remaining in the asymmetric operating regime are as follows:

- the aircraft is airborne;
- an altitude of the aircraft is greater than a second threshold;
- an airspeed of the aircraft is greater than a third threshold;
- an accessory gearbox electrical load is disabled;
- an environmental control system bleed load is disabled;
- a main rotor reference speed is set to a manufacturer-defined speed;
- an electrical power system of the aircraft is online;
- an autopilot is online and free of system faults; and
- engines are not in an autorotation mode.

Other aircraft operating conditions may also be used, alone or in combination with any of the aircraft operating conditions listed above.

At step 304, the exit category of the request is determined. For example, the exit category may be a normal system-commanded exit, a normal pilot-commanded exit, an emergency system-commanded exit, or an emergency pilot-commanded exit. In some embodiments, only two exit categories are used: emergency or normal. Other exit categories are also considered.

At step 306, the corresponding exit protocol for the determined exit category is selected. For example, the exit protocol may be a slow transition to AEO, a rapid transition to AEO, a very rapid transition to AEO, a maximum acceleration to OEI, etc. Various acceleration rates may be associated with each exit protocol.

At step 308, the selected exit protocol is applied in order to transition the engines out of the asymmetric operating regime. This may comprise performing the change in engine speed or commanding another system of the engine or aircraft to change the engine speed.

In some embodiments, the method 300 is performed by the FADEC of the aircraft H. In some embodiments, a portion of the method 300 is performed by the FADEC. For example, the set of engine parameters are monitored and the system-commanded exit request is output by the FADEC.

Figure 4:
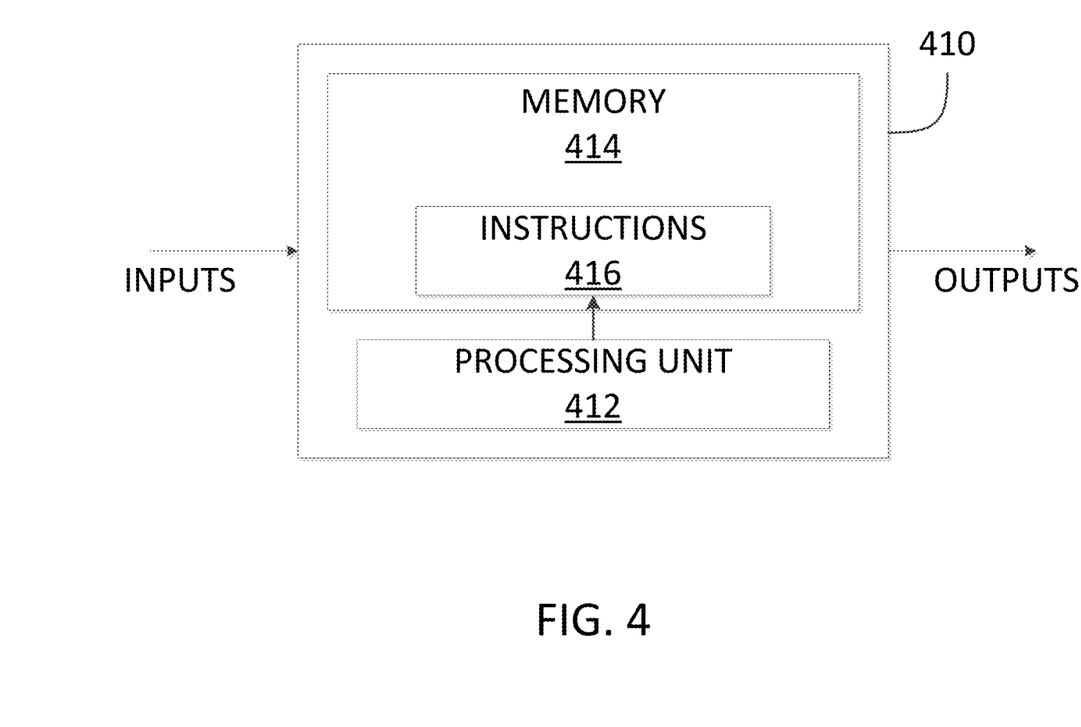
FIG. 4 is a block diagram of an example computing device for implementing the method of FIG. 3.

With reference to FIG. 4, the method 300 may be implemented by a computing device 410 as an embodiment of the AOR system 206. The computing device 410 comprises a processing unit 412 and a memory 414 which has stored therein computer-executable instructions 416. The processing unit 412 may comprise any suitable devices configured to implement the functionality of the AOR system 206 such that instructions 416, when executed by the computing device 410 or other programmable apparatus, may cause the functions/acts/steps performed by the AOR system 206 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

The methods and systems for exiting an asymmetric operating regime as described herein may be implemented in a high level procedural or object oriented programming or scripting language, or a combination thereof, to communicate with or assist in the operation of a computer system, for example the computing device 410. Alternatively, the methods and systems for exiting an asymmetric operating regime may be implemented in assembly or machine language. The language may be a compiled or interpreted language.

Embodiments of the methods and systems for exiting an asymmetric operating regime may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A system for operating an aircraft having two or more engines, the system comprising:
   a processing unit; and
   a non-transitory storage medium having stored thereon program code executable by the processing unit for:
      operating the two or more engines of the aircraft in an asymmetric operating regime, wherein a first of the engines is in an active mode to provide motive power to the aircraft and a second of the engines is in a standby mode to provide substantially no motive power to the aircraft;
      receiving a request to exit the asymmetric operating regime;
      determining whether the request to exit the asymmetric operating regime is pilot-commanded or system-commanded;
      when the request to exit the asymmetric operating regime is pilot-commanded, selecting a first exit protocol and applying the first exit protocol by commanding the engines accordingly, the first exit protocol including accelerating the second engine and transitioning to an all engine operative (AEO) mode of operation; and when the request to exit the asymmetric operating regime is system-commanded, selecting a second exit protocol and applying the second exit protocol by commanding the engines accordingly, the second exit protocol including accelerating the second engine and transitioning to a one engine inoperative (OEI) mode of operation.

2. The system of claim 1, wherein the first and second exit protocols comprise different acceleration rates for the second engine.

3. The system of claim 1, wherein the first exit protocol is associated with a non-emergency exit of the asymmetric operating regime and the second exit protocol is associated with an emergency exit of the asymmetric operating regime.

4. The system of claim 3, wherein the system-commanded request to exit the asymmetric operating regime is received from a Full Authority Digital Engine Control (FADEC).

5. The system of claim 1, wherein the first exit protocol comprises a first acceleration rate for the second engine, and the second exit protocol comprises a second acceleration rate for the second engine greater than the first acceleration rate.

6. The system of claim 1, wherein the second exit protocol comprises shutting down the first engine.

7. The system of claim 6, wherein the second engine is accelerated at a maximum permissible acceleration rate.

8. The system of claim 1, wherein the program code is further executable for determining that operating conditions associated with the asymmetric operating regime are no longer met, and generating the request to exit the asymmetric operating regime.

* * * * *